(12) United States Patent
Dontula et al.

(10) Patent No.: US 9,675,937 B2
(45) Date of Patent: Jun. 13, 2017

(54) SPIRAL WOUND MEMBRANE PERMEATE CARRIER WITH THIN BORDER

(75) Inventors: Prasanna Rao Dontula, Bangalore (IN); Yatin Tayalia, Singapore (SG); Phillip Goebel, Minnetonka, MN (US)

(73) Assignee: General Electric Company, Schenectady, NY (US)

( * ) Notice: Subject to any disclaimer, the term of this patent is extended or adjusted under 35 U.S.C. 154(b) by 829 days.

(21) Appl. No.: 13/276,802

(22) Filed: Oct. 19, 2011

(65) Prior Publication Data

US 2013/0101797 A1    Apr. 25, 2013

(51) Int. Cl.
  *B01D 17/12* (2006.01)
  *B01D 63/10* (2006.01)

(52) U.S. Cl.
  CPC ............ *B01D 63/103* (2013.01); *B01D 63/10* (2013.01); *B01D 2313/146* (2013.01); *B01D 2325/08* (2013.01); *Y10T 156/10* (2015.01); *Y10T 428/2457* (2015.01); *Y10T 428/24488* (2015.01); *Y10T 428/24612* (2015.01); *Y10T 428/24777* (2015.01)

(58) Field of Classification Search
  CPC  B01D 63/10; B01D 63/103; B01D 2313/146; B01D 2325/08; Y10T 428/24488; Y10T 428/2457; Y10T 428/24612; Y10T 428/24777
  USPC ............ 428/156, 157, 192, 213; 210/321.74, 210/483, 541
  See application file for complete search history.

(56) References Cited

U.S. PATENT DOCUMENTS

| | | | |
|---|---|---|---|
| 3,173,867 A | 3/1965 | Michaels | |
| 3,332,216 A * | 7/1967 | Stern | ................. 96/12 |
| 3,494,468 A | 2/1970 | Kohl | |
| 3,508,994 A | 4/1970 | Nyrop | |
| T887,014 I4 * | 6/1971 | Overbay et al. | ........ E04F 13/04 156/291 |
| 3,827,563 A * | 8/1974 | Boe | ........................ B01D 61/28 210/321.75 |
| 3,984,319 A | 10/1976 | Hubbard et al. | |
| 3,985,655 A * | 10/1976 | Miller, III | ................ 210/321.74 |

(Continued)

FOREIGN PATENT DOCUMENTS

| | | |
|---|---|---|
| EP | 0129663 B1 | 5/1988 |
| EP | 0443642 A2 | 8/1991 |

(Continued)

OTHER PUBLICATIONS

WO 02/05934, Jan. 2002.*

(Continued)

*Primary Examiner* — Donald J Loney

(57) ABSTRACT

A permeate carrier to be described in detail below has side edges, alternatively called borders, that are thinner than a central part of the permeate carrier. Adhesive is applied to the side edges to form a seal when a membrane leaf is formed around the permeate carrier. After the membrane leaf is wound around a central tube, the side edges extend in a spiral around the central tube. The transition between the side edges and the central part of the permeate carrier helps prevent adhesive from flowing into the central part of the permeate carrier. The reduced thickness of the side edges also reduces an increase in diameter at the ends of an element that might otherwise be caused by the adhesive.

12 Claims, 3 Drawing Sheets

(56) References Cited

U.S. PATENT DOCUMENTS

| | | | |
|---|---|---|---|
| 4,235,723 A * | 11/1980 | Bartlett, Jr. | 210/321.83 |
| 4,264,447 A | 4/1981 | Nicolet | |
| 4,455,337 A * | 6/1984 | Lloyd | B29C 59/022 264/280 |
| 4,476,022 A * | 10/1984 | Doll | 210/321.83 |
| 4,735,717 A | 4/1988 | Sims | |
| 4,802,982 A | 2/1989 | Lien | |
| 4,855,058 A * | 8/1989 | Holland | B01D 53/22 210/321.74 |
| 4,902,417 A | 2/1990 | Lien | |
| 5,069,793 A | 12/1991 | Kaschemekat et al. | |
| 5,096,584 A | 3/1992 | Reddy et al. | |
| 5,096,591 A | 3/1992 | Benn | |
| 5,104,532 A | 4/1992 | Thompson et al. | |
| 5,108,604 A | 4/1992 | Robbins | |
| 5,147,541 A * | 9/1992 | McDermott et al. | 210/321.74 |
| 5,154,832 A | 10/1992 | Yamamura et al. | |
| 5,275,726 A * | 1/1994 | Feimer et al. | 210/321.74 |
| 5,458,774 A | 10/1995 | Mannapperuma | |
| 5,538,642 A | 7/1996 | Solie | |
| 5,626,752 A | 5/1997 | Mohn et al. | |
| 5,681,467 A * | 10/1997 | Solie et al. | 210/486 |
| 5,858,229 A * | 1/1999 | Uemura et al. | 210/321.75 |
| 6,068,771 A | 5/2000 | McDermott et al. | |
| 6,106,715 A | 8/2000 | Thalmann et al. | |
| 6,224,767 B1 | 5/2001 | Fujiwara et al. | |
| 6,299,772 B1 | 10/2001 | Huschke et al. | |
| 6,413,424 B1 | 7/2002 | Shelby | |
| 6,432,310 B1 | 8/2002 | Andou et al. | |
| 6,524,478 B1 | 2/2003 | Heine et al. | |
| 6,632,357 B1 | 10/2003 | Barger et al. | |
| 6,656,362 B1 | 12/2003 | Kihara et al. | |
| 6,673,242 B1 * | 1/2004 | Herron | 210/321.74 |
| 7,048,855 B2 | 5/2006 | de la Cruz | |
| 7,264,724 B2 | 9/2007 | Vigna et al. | |
| 7,425,387 B2 * | 9/2008 | Bohnstedt | H01M 2/18 428/167 |
| 7,828,970 B2 | 11/2010 | Kloos et al. | |
| 7,892,430 B2 | 2/2011 | Voigt et al. | |
| 2004/0099598 A1 | 5/2004 | Cheng | |
| 2004/0124133 A1 | 7/2004 | Irie et al. | |
| 2004/0188342 A1 | 9/2004 | Bellhouse et al. | |
| 2004/0195164 A1 | 10/2004 | Hirokawa et al. | |
| 2006/0043013 A1 | 3/2006 | Hiro et al. | |
| 2006/0141216 A1 * | 6/2006 | Hartman et al. | 428/156 |
| 2007/0056894 A1 | 3/2007 | Connors, Jr. | |
| 2007/0068864 A1 | 3/2007 | Cruz et al. | |
| 2008/0251442 A1 * | 10/2008 | Shen et al. | 210/315 |
| 2010/0051546 A1 | 3/2010 | Vuong et al. | |
| 2010/0096316 A1 | 4/2010 | Chikura et al. | |
| 2011/0192794 A1 | 8/2011 | Chidambaran et al. | |

FOREIGN PATENT DOCUMENTS

| | | |
|---|---|---|
| EP | 0508646 A1 | 10/1992 |
| EP | 1462154 A1 | 9/2004 |
| JP | 5480542 U | 6/1979 |
| JP | 06319965 A | 11/1994 |
| JP | 2001300271 A | 10/2001 |
| JP | 2006218345 A | 8/2006 |
| WO | 0027511 A1 | 5/2000 |
| WO | 0078436 A1 | 12/2000 |
| WO | 0220142 A1 | 3/2002 |
| WO | 03/101575 A9 | 6/2003 |
| WO | 2005070524 A1 | 8/2005 |
| WO | 2005097304 A1 | 10/2005 |
| WO | 2005097305 A1 | 10/2005 |
| WO | 2006015461 A1 | 2/2006 |

OTHER PUBLICATIONS

Unofficial English Translation of Chinese Office Action issued in connection with corresponding CN Application No. 201280051184.3 on Apr. 16, 2015.

PCT Search Report and Opinion issued in connection with related Application No. PCT/US2012/058551 on Jul. 4, 2013.

US Non-Final Office Action issued in connection with related U.S. Appl. No. 13/473,252 on Nov. 16, 2015.

Unofficial English Translation of Japanese Office Action issued in connection with related JP Application No. 2014537093 on Jan. 15, 2016.

U.S. Appl. No. 13/473,252, filed May 16, 2012, Prashant Vishwanath Shrikhande et al.

Unofficial English Translation of Japanese Office Action issued in connection with related JP Application No. 2014537093 on May 31, 2016.

US Final Office Action issued in connection with related U.S. Appl. No. 13/473,252 on Jun. 3, 2016.

* cited by examiner

SPIRAL WOUND MEMBRANE PERMEATE CARRIER WITH THIN BORDER

FIELD

This specification relates to spiral wound membrane elements and modules and to permeate carriers for spiral wound membrane elements and modules.

BACKGROUND

A spiral wound membrane element is made by wrapping one or more membrane leaves and feed spacer sheets around a perforated central tube. The leaves have a permeate carrier sheet placed between two generally rectangular membrane sheets.

The membrane sheets are sealed together along three edges. The fourth edge of the leaf is open and abuts the central tube. One or more layers of permeate carrier sheet may also be wrapped around the central tube to support the membrane leaf over the perforations in the central tube and to provide a flow path between the edge of the leaf and the central tube. Product water, also called permeate, passes through the membrane sheets and then flows through the permeate carrier sheet to reach the central tube. US Patent Application Publication Number 2007/0068864 describes one example of a spiral wound membrane element.

The permeate carrier sheet may be a tricot fabric woven from epoxy or Melamine-coated polyester filaments. The tricot fabric is porous and forms a series of parallel ridges, which keep the membrane leaf from collapsing, separated by grooves on one side of the fabric. The grooves are oriented perpendicular to the central tube to provide less obstructed passages for permeate to flow inwards through the leaves to the central tube. A separate reinforcing or anti-bagging layer, made for example of felt or another non-woven or otherwise porous sheet material, may be placed between the membrane sheet and the tricot fabric to help keep the membrane sheet from being pressed into the grooves of the tricot.

U.S. Pat. No. 6,656,362 discloses various dimensions and materials for a permeate carrier sheet and reinforcing sheets that may be used with a high pressure spiral wound membrane. International Publication Number WO 03/101575 discloses permeate carrier materials intended to have low resistance to flow. U.S. Pat. Nos. 4,802,982 and 7,048,855 describe permeate carrier materials that are directly bonded to a membrane sheet. US Patent Application Publication No. 2004/0195164 A1 describes a spiral wound membrane element in which a) the total area of perforations in the central tube multiplied by the percentage of openings of one layer of a permeate carrier wrapped around the central tube is at least as much as b) the inner cross-sectional area of the central tube.

INTRODUCTION TO THE INVENTION

A permeate carrier to be described in detail below has one or more borders, at the side edges of the permeate carrier, that are thinner than a central part of the permeate carrier. The permeate carrier may be used in a membrane leaf in a spiral wound membrane element or module. In the membrane leaf, the permeate carrier is located between upper and lower membrane sheets. An adhesive is applied in lines to the one or more borders, and any other edges of the leaf needing to be sealed. Compression applied to the membrane leaf before or while winding the leaf around a central tube, or both, causes the adhesive to penetrate through the permeate carrier to join the two membrane sheets together.

The compression applied to the membrane leaf also causes the lines of adhesive to spread or widen, possibly in an uneven manner. Any increase in the width of the adhesive lines causes a corresponding reduction in the active membrane area, meaning the membrane area that product water can permeate through. Further, the permeate carrier comprises a series of permeate channels and a local bulge in the spreading adhesive might block one or more of these channels. A transition between the relatively thin border and the central part of the permeate carrier resists adhesive spreading into the central part of the permeate carrier beyond the transition. The transition is located to provide an adequate width of adhesive after the ends of the element are trimmed to their final length. The transition encourages adhesive to spread parallel to the transition to any part of the border that is lacking adhesive, or to the outsides of the membrane leaf which will be removed when the element is trimmed to its final length. This tends to reduce losses in the active area of the membrane leaf and blocked permeate channels beyond what is required to provide an adequate amount of adhesive.

After the membrane leaf is wound around the central tube, the side edges with their attached lines of adhesive extend in a spiral around the central tube. In the absence of relatively thin borders, the ends of a membrane element would have a larger diameter than the central part. The outer diameter of the ends of the element limits the number or length of membrane leaves that may be placed in a pressure vessel of a given inside diameter. Providing relatively thin borders in the permeate carrier at least reduces any increase in diameter at the ends of an element that might otherwise be caused by the adhesive. Accordingly, more or longer membrane leaves may be placed in a pressure vessel of a given inside diameter, thus increasing the active membrane area of the element.

The basic requirements of a spiral wound membrane element are high permeate throughput or flow, high solute rejection and low fouling tendency. The permeate carrier described above aims to increase the permeate throughput of an element without materially affecting the solute rejection or fouling tendency. Permeate throughput is increased by increasing the active membrane area within a pressure vessel of a given internal diameter, or by avoiding blocked permeate channels, or both. An increase in active membrane area tends to produce a higher permeate flux per element.

DETAILED DESCRIPTION

Figure 1:
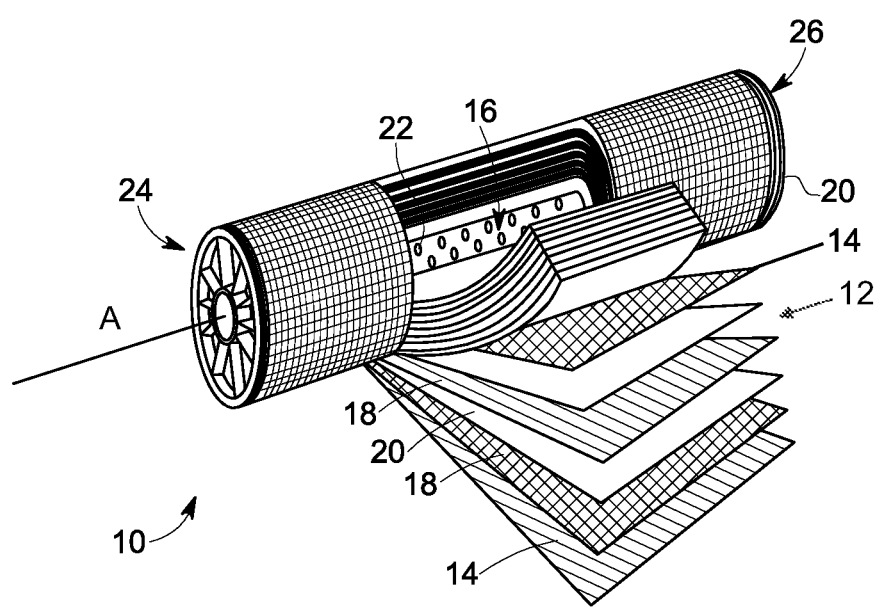
FIG. 1 is a cut-away perspective view of a spiral wound membrane element.
Figure 2:
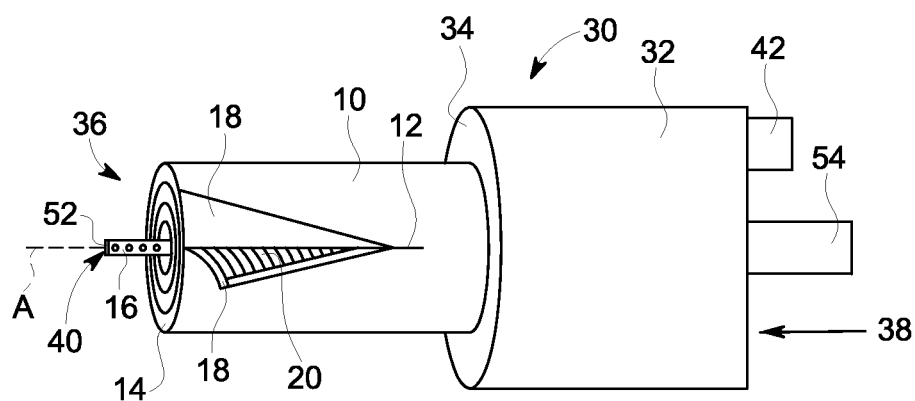
FIG. 2 is a cut-away perspective view of a spiral wound membrane module including the element of FIG. 1.

Referring to FIGS. 1 and 2, a spiral wound membrane element 10 is formed by wrapping one or more membrane leaves 12 and feed spacer sheets 14 around a perforated central tube 16. The membrane leaves 12 may also be called envelopes. The feed spacer sheets 14 may also be called brine channel spacers. The central tube 16 may also be called a core, a permeate tube or a product water collection tube. The leaves 12 comprise two generally rectangular membrane sheets 18 surrounding a permeate carrier 20. The edge of the membrane leaf 12 abutting the central tube 16 is open, but the other three edges of a leaf 12 are sealed, for example by an adhesive. Less frequently, the two membrane sheets 18 of a membrane leaf 12 may be attached through a fold line at the tip of the leaf, in which case only the two side edges of a membrane leaf 12 are sealed with adhesive. The permeate carrier 20 is shown schematically in FIGS. 1 and 2 but will be shown in more detail in FIGS. 3 and 4.

The membrane sheets 18 may have a separation layer cast onto a supporting or backing layer. The separation layer may be, for example, cellulose acetate, a polyamide, a thin film composite or other materials that may be formed into a separation membrane. The separation layer may have pores, for example, in the reverse osmosis, nanofiltration or ultrafiltration range. Filtered product water, also called permeate, passes through the membrane sheet while the passage of dissolved salts or suspended solids or other contaminants are rejected by the membrane sheet 18 depending on its pore size.

The permeate carrier 20 is in fluid contact with rows of small holes 22 in the central tube 16 through the open abutting edge of the membrane leaf 12. An additional permeate carrier sheet (not shown), which might or might not be the same material as the permeate carrier 20 in the membrane leaves 12, or an extension of the permeate carrier 20 of a first membrane leaf 12, may be wrapped around the central tube 16 in one or more layers before the first membrane leaf 12 is attached to the central tube 16. This initial wrap of permeate carrier 20 supports the membrane leaves 12 over the holes 22 and provides a path to conduct permeate water from the membrane leaves 12 to the holes 22 in the central tube 16. The holes 22 typically have a diameter of about 0.125 inches (3.2 mm) and conduct product water to the inside of the central tube 16.

Each leaf 12 is separated by a feed spacer sheet 14 that is also wound around the central tube 16. The feed spacer 14 is in fluid contact with both ends of the element 10 and it acts as a conduit for feed solution across the surface of the membrane sheets 18. The direction of feed flow is from the entrance end 24 to the concentrate end 26 parallel to the axis A of the central tube 16.

Referring to FIG. 2, a spiral wound membrane module 30 has an element 10 located inside of a pressure vessel 32. The pressure vessel 32 has a generally tubular body 34, an inlet end 36 and an outlet end 38. Feed water enters through an inlet (not shown) of the pressure vessel 32. The feed water travels through the feed spacer 14 of the element 10. A portion of the feed water that does not pass through the membrane sheets 18, which may be called brine, retentate or reject water, leaves the pressure vessel 32 through a discharge tube 42. Product water, or permeate, collects in the inside of the central tube 16 and then typically travels in a direction from a first end 52 to a second end 54 of the central tube 16. The second end 54 of the last, or an only, element 10 may be sealed, may exit the pressure vessel 32 or may be connected to a fitting that exits the pressure vessel. The first end 52 of a first or only element 10 may be sealed, may exit the pressure vessel 32 or may be connected to a fitting that exits the pressure vessel 32. If there are multiple elements 10 in a pressure vessel 32, the second end 54 of an upstream element 10 is typically connected to the first end 52 of a downstream element. Feed water flows in series through the feed spacers 14 of multiple elements 10 in a pressure vessel. Peripheral seals may be provided between an outer wrap (not shown) of the element 10 and the inside of a pressure vessel 32 to prevent feed water from flowing past an element 10 without passing through its feed spacers 14.

Figure 3:
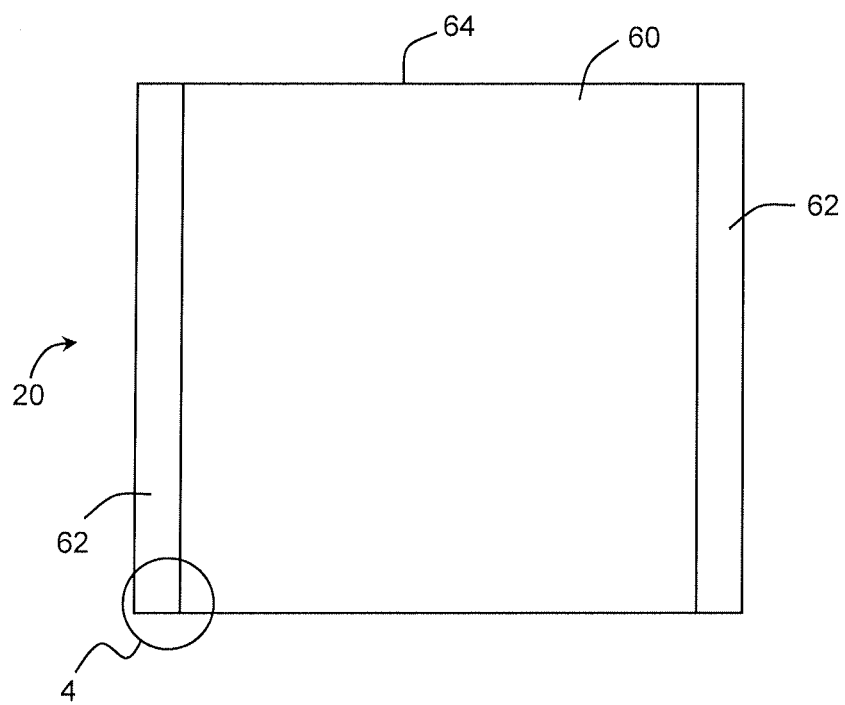
FIG. 3 is a top view of a permeate carrier.
Figure 4:
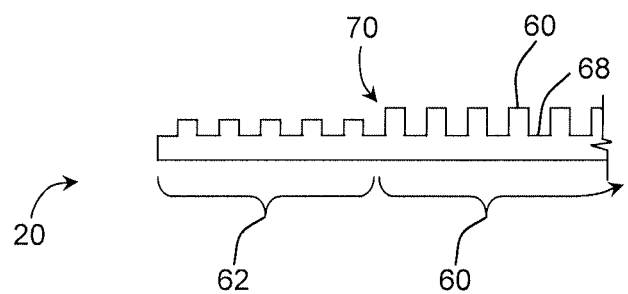
FIG. 4 is a side view of a portion of the permeate carrier of FIG. 3.

FIGS. 3 and 4 show the permeate carrier 20 in more detail. The permeate carrier 20 has a central portion 60 and one, or preferably two, borders 62. The borders 62 are generally perpendicular to a front edge 64 of the permeate carrier 20 that will be open to the central tube 16. The permeate carrier 20 may be a woven sheet made, for example, of polymeric filaments. The filaments in the permeate carrier 20 may be made of organic polymers such as nylon, polypropylene or polyester. The filaments may be coated with epoxy or melamine, or the woven permeate carrier 20 may be impregnated with epoxy or melamine, to help stabilize the permeate carrier 20.

The central portion 60, and optionally the borders 62, may be woven into a tricot fabric. In a tricot fabric, the yarn zigzags vertically along columns of the knit resulting in a series of parallel raised wales 66 separating permeate channels 68 on a front side, alternately called the wale side, of the fabric. On the back side of the fabric, which may be called the course side, ribs are formed perpendicular to the raised wales 66, but the ribs are not as sharply defined as the raised wales 66 and are not as tall as the raised wales 66. A transition 70 separates the central portion 60 from a border 62.

The borders 62 may be produced by applying pressure to the side edges of an initially homogenous permeate carrier 20. For example, the side edges may be calendared. Alternatively, the permeate carrier 20 may be manufactured with thinner borders 62. For example, thinner yarn may be used at the edges of a sheet (in the machine direction) during a warp knitting process similar to that used to produce conventional permeate spacers. For further example, a sheet may me be knit without wales at the edges of a sheet. These two basic techniques may also be combined. For example, a fabric may be knit with more deformable yarns or fewer wales per inch at the edges, followed by applying pressure to the edges.

The inventors have observed that a membrane leaf made with a homogenous permeate carrier tends to have side edges (the edges perpendicular to the central tube) that are 2 to 5 mil, or 10 to 22%, thicker than the remainder of the membrane leaf. The increase in thickness is caused by the adhesive, alternatively called glue lines, used to seal the edges of a membrane leaf. Since the outer diameter of an element is typically maintained within a narrow range relative to the inside diameter of a pressure vessel, the limiting diameter of the element is typically formed by the side edges of the membrane leaves.

With a permeate carrier 20 as described above, the reduced thickness of the borders 62 reduces the thickness of the side edges of the membrane leaf 12. For example, the thickness of the permeate carrier 20 at the borders 62 can be 2 to 5 mil thinner than the central part 60 of the permeate carrier 20. The increases thickness of the side edges of a membrane leaf 12 is at least reduced, and optionally the side edges of the membrane leaf 12 may be thinner than or equal to a central portion of the membrane leaf 12. Each membrane leaf 12 may then be made longer, or an additional membrane leaf 12 may be added, to increase the total membrane area of the element 10.

The inventors have also observed that the glue lines materially reduce the active area of a membrane leaf. In a typical manufacturing process, one membrane sheet is laid out horizontally on a table and a homogenous permeate carrier is placed on it. Glue lines are laid down on the two side edges and the leaf tip edge of the homogenous permeate carrier. Another membrane sheet is laid over the homogenous permeate carrier and the glue lines to complete the leaf. The edges of the leaf might be compressed while still resting on the table. The leaf is also compressed due to tension applied while the leaf is wound around the central tube. The glue spreads from its initial location as the leaf is compressed. Glue spreading inwards reduces the active membrane area. The width of the glue lines may vary between, for example, 1 inch with automatic glue application and 1.75 inches with manual glue application. Further local increases in the width of a glue line may be caused by a glue line that veered inwards when it was laid down, by a local increase in the thickness of the glue line when it was applied, or by a locate increase in compression.

A similar manufacturing technique may be used with the element 10, but when a permeate carrier 20 with thinner borders 62 is used, the adhesive is also encouraged to spread outwards, rather inwards of past the transition 70. The transition 70 is located to provide an adequate, but not excessive, width of adhesive at the side edges of a membrane leaf 12. The borders 62 thus inhibit excessive loss in membrane active area. Compared to a typical manually rolled element, the active membrane area could be increased by about 4% by restricting spread of the adhesive beyond the 1 inch side glue lines experienced with automated gluing. However, the inventors believe that the transition 70 may allow thinner glue lines to be sufficient, which would create a corresponding increase in active membrane area per element. A further benefit would be reduced local blockage of otherwise open permeate channels, which would allow membrane area past the blockage be more productive. In some cases, less glue might be used per element.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A permeate carrier for a spiral wound membrane comprising:
   a woven sheet having:
   a central portion having a front edge and a pair of side edges generally perpendicular to the front edge; and,
   one or more borders along one or both side edges of the central portion,
   wherein the central portion and the one or more borders having a series of raised ribs extending from a front surface of the permeate carrier, the raised ribs running generally parallel to the pair of side edges and defining permeate channels on the front surface,
   wherein the raised ribs in the central portion extend further from the front side than the raised ribs in the one or more borders such that the one or more borders are thinner than the central portion, and
   wherein a first spacing between the raised ribs in the central portion is substantially equal to a second spacing between the raised ribs in the one or more borders.

2. The permeate carrier of claim 1 wherein the one or more borders are at least 2 mil thinner than the central portion.

3. The permeate carrier of claim 2 wherein the one or more borders are between 2 and 5 mil thinner than the central portion.

4. The permeate carrier of claim 1 wherein the borders are initially of the same thickness as the central portion but have been compressed to be thinner than the central portion.

5. The permeate carrier of claim 1 wherein the borders are knitted with one or more of a) thinner yarn, b) more deformable yarn, and c) or fewer, including no, wales per inch, relative to the central portion.

6. The permeate carrier of claim 1 wherein the one or more borders have a width between 1 inch and 1.75 inches.

7. A spiral wound membrane comprising:
   two membrane sheets;
   a permeate carrier between the two membrane sheets, the permeate carrier comprising:
   a woven sheet having:
      a central portion having a front edge, and a pair of side edges generally perpendicular to the front edge;
      one or more borders along one or both side edges of the permeate carrier;
      wherein the central portion and the one or more borders having a series of raised ribs extending from a front surface of the permeate carrier, the raised ribs running generally parallel to the pair of side edges and defining permeate channels on the front surface;
      wherein the raised ribs in the central portion extend further from the front side than the raised ribs in the one or more borders such that the one or more borders are thinner than the central portion;
      wherein a first spacing between the raised ribs in the central portion is substantially equal to a second spacing between the raised ribs in the one or more borders;
   wherein the permeate carrier is glued to the two membrane sheets at one or more the borders along one or both side edges.

8. The spiral wound membrane of claim 7 wherein the one or more borders are at least 2 mil thinner than the central portion.

9. The spiral wound membrane of claim 8 wherein the one or more borders are between 2 and 5 mil thinner than the central portion.

10. The spiral wound membrane of claim 7 wherein the borders are compressed to be thinner than the central portion during gluing the two membranes to the borders.

11. The spiral wound membrane of claim 7 wherein the borders are knitted with one or more of a) thinner yarn, b) more deformable yarn, and c) or fewer, including no, wales per inch, relative to the central portion.

12. The spiral wound membrane of claim 7 wherein the one or more borders have a width for an adequate width of between 1 inch and 1.75 inches.

* * * * *